US012569923B1

(12) United States Patent
Abidi et al.

(10) Patent No.: US 12,569,923 B1
(45) Date of Patent: Mar. 10, 2026

(54) MICRO-ELECTRIC DISCHARGE MILLING MACHINE WITH SPARK CONTROL

(71) Applicant: KING SAUD UNIVERSITY, Riyadh (SA)

(72) Inventors: Mustufa Haider Abidi, Riyadh (SA); Arshad Noor Sidiquee, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/950,651

(22) Filed: Nov. 18, 2024

(51) Int. Cl.
| | |
|---|---|
| *B23H 7/12* | (2006.01) |
| *B23H 7/14* | (2006.01) |
| *B23H 7/36* | (2006.01) |

(52) U.S. Cl.
CPC ................. *B23H 7/12* (2013.01); *B23H 7/14* (2013.01); *B23H 7/36* (2013.01)

(58) Field of Classification Search
CPC .......... B23H 1/022; B23H 1/02; B23H 1/024; B23H 1/08; B23H 1/10; B23H 11/00; B23H 2300/20; B23H 5/00; B23H 7/12; B23H 7/26; B23H 7/28; B23H 7/30; B23H 7/36; B23H 9/00
USPC ............ 219/69.16, 69.17, 69.18, 69.19, 69.2
See application file for complete search history.

(56) References Cited

U.S. PATENT DOCUMENTS

| | | | | | |
|---|---|---|---|---|---|
| 5,245,152 | A | * | 9/1993 | McCall | .................... B23H 1/08 |
| | | | | | 409/137 |
| 5,281,788 | A | * | 1/1994 | Abiko | ..................... B23H 1/10 |
| | | | | | 219/69.14 |
| 5,498,848 | A | | 3/1996 | Wakabayashi et al. | |
| 5,854,459 | A | | 12/1998 | Bühler et al. | |
| 6,353,199 | B1 | | 3/2002 | Hosaka et al. | |
| 6,365,895 | B1 | | 4/2002 | Yamamoto | |
| 6,407,356 | B1 | * | 6/2002 | Lai | ........................... B23H 1/00 |
| | | | | | 219/69.11 |

(Continued)

FOREIGN PATENT DOCUMENTS

| | | |
|---|---|---|
| CN | 105642734 B | 7/2017 |
| CN | 209206647 U | 8/2019 |

(Continued)

OTHER PUBLICATIONS

Machine translation of KR-101205876-B1, Jan. 2025 (Year: 2025).*

(Continued)

*Primary Examiner* — Vy T Nguyen
(74) *Attorney, Agent, or Firm* — Nath, Goldberg & Meyer; Joshua B. Goldberg

(57) ABSTRACT

The micro-electric discharge milling machine includes a base having an X-axis guide plate mounted thereon, allowing for movement in the X-direction. A Y-axis guide plate is mounted on the X-axis guide plate, allowing for movement in the Y-direction. A dielectric bin is located on the Y-axis guide plate and is movable in the X-direction and the Y-direction via the X-axis guide plate and Y-axis guide plate, respectively. A workpiece platform is located within the dielectric bin for securing a workpiece. A vertical plate with a Z-axis guide plate extends from the base. A drill chuck is mounted on the Z-axis guide plate for securing a rotating electrode. A spark control circuit controls a location of a spark generated by the rotating electrode with respect to a surface of the rotating electrode.

5 Claims, 12 Drawing Sheets

(56)          References Cited

U.S. PATENT DOCUMENTS

| | | | | |
|---|---|---|---|---|
| 6,448,529 | B1 * | 9/2002 | Hiraishi | B23H 9/00 |
| | | | | 219/69.16 |
| 6,624,377 | B2 | 9/2003 | Gianchandani et al. | |
| 6,809,285 | B2 | 10/2004 | Masaki et al. | |
| 8,715,468 | B2 | 5/2014 | Cabrera | |
| 9,440,301 | B2 | 9/2016 | Okazaki et al. | |
| 9,700,975 | B2 | 7/2017 | Kelkar | |
| 10,556,282 | B2 | 2/2020 | Mraz et al. | |
| 2005/0252887 | A1 * | 11/2005 | Shih | B23H 7/265 |
| | | | | 219/69.15 |
| 2010/0163427 | A1 * | 7/2010 | Zhan | B23H 7/20 |
| | | | | 204/229.4 |
| 2014/0144884 | A1 * | 5/2014 | Suzuki | B23H 9/14 |
| | | | | 219/69.11 |

FOREIGN PATENT DOCUMENTS

| | | |
|---|---|---|
| CN | 111283278 A | 6/2020 |
| CN | 111230236 B | 12/2020 |
| CN | 112351864 A * | 2/2021 ............ B23B 47/26 |
| CN | 113770465 A * | 12/2021 |
| CN | 115178817 A * | 10/2022 |
| EP | 0129340 B1 | 11/1988 |
| EP | 0306902 B1 | 3/1992 |
| JP | 63185520 A * | 8/1988 |
| JP | H 10283007 * | 10/1998 |
| JP | 2006263871 A * | 10/2006 |
| KR | 101205876 B1 * | 12/2012 |
| TW | M261310 U | 4/2005 |

OTHER PUBLICATIONS

Machine translation of CN-115178817-A, Jan. 2025 (Year: 2025).*
Machine translation of CN-112351864-A, Jan. 2025 (Year: 2025).*
Machine translation of JP-2006263871-A, Jan. 2025 (Year: 2025).*
Machine translation of CN-113770465-A, Apr. 2025 (Year: 2025).*
Machine translation of abstract of JP-63185520-A, Apr. 2025 (Year: 2025).*

* cited by examiner

CONTINUED FROM FIG. 6

CONTINUED FROM FIG. 6

1

MICRO-ELECTRIC DISCHARGE MILLING MACHINE WITH SPARK CONTROL

BACKGROUND

Field

The present disclosure relates to milling machines, and particularly to a micro-electric discharge milling machine.

Description of Related Art

Micro-electric discharge milling is a machining process used for the fabrication of microstructures in hard and conductive materials, such as metals, alloys, composites, ceramics, etc. Micro-electric discharge milling utilizes the principle of electrical discharge machining (EDM) but on a much smaller scale, typically involving features in the micrometer range. However, micro-electric milling is generally a slow process compared to conventional machining methods. The tool electrode tends to wear during machining, leading to the need for frequent electrode replacement or re-sharpening. Achieving a smooth surface finish can be challenging, especially with rougher cuts or complex geometries.

Overall, micro-EDM is a valuable technique for manufacturing micro-components and structures with high precision and intricate features. Micro-EDM finds applications in industries such as electronics, aerospace, biomedical engineering, and micro-electromechanical systems (MEMS) fabrication. Despite the wide variety of uses of micro-EDM, the spark created between the electrode and the workpiece during operation can rapidly erode the electrode. It would be desirable to be able to control the spark in order to extend the lifetime of the electrode. Thus, a micro-electric discharge milling machine solving the aforementioned problems is desired.

SUMMARY

The micro-electric discharge milling machine includes a base having an X-axis guide plate mounted thereon, allowing for movement in the X-direction. A Y-axis guide plate is mounted on the X-axis guide plate, allowing for movement in the Y-direction. A dielectric bin is located on the Y-axis guide plate and is movable in the X-direction and the Y-direction via the X-axis guide plate and Y-axis guide plate, respectively. A workpiece platform is located within the dielectric bin for securing a workpiece. A vertical plate with a Z-axis guide plate extends from the base. A drill chuck is mounted on the Z-axis guide plate for securing a rotating electrode. A spark control circuit controls a location of a spark generated by the rotating electrode with respect to a surface of the rotating electrode.

The rotating electrode is movable in the Z-direction via the Z-axis guide plate, and the spark control circuit is configured to control the spark generated by the rotating electrode such that the spark is delivered onto a surface of the workpiece to evaporate and melt a portion of the surface.

A dielectric fluid inlet block may be mounted on the Z-axis guide plate for directing a dielectric fluid to a machining spot. The dielectric bin is adapted for receiving the dielectric fluid such that the rotating electrode and the workpiece may be submerged therein.

Additionally, a counterweight clamp may be mounted on the Y-axis guide plate, and a spindle motor may be connected to a spindle mounted within the drill chuck for rotating the rotating electrode.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 5:
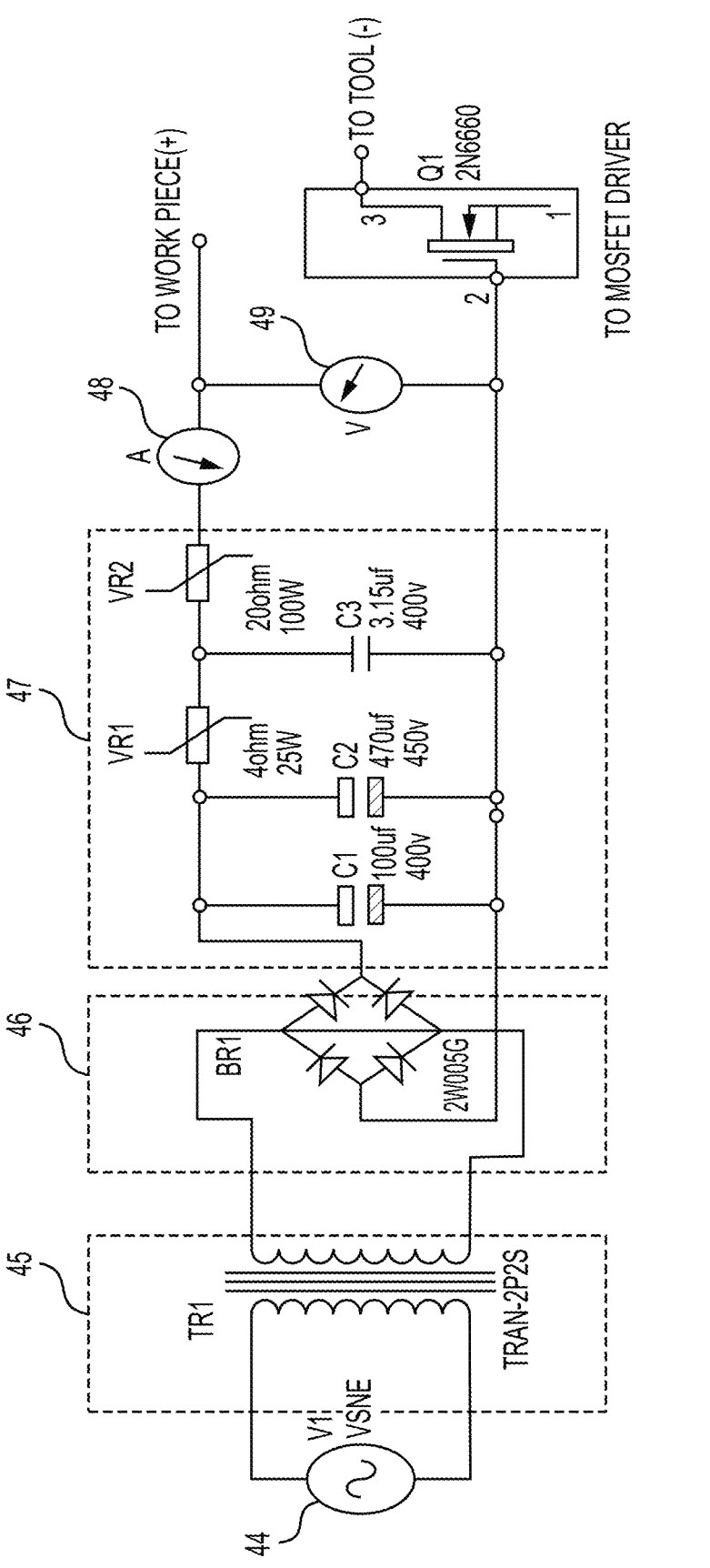
FIG. 5 is a schematic diagram of a spark control circuit of the pEDMM.
Figure 6:
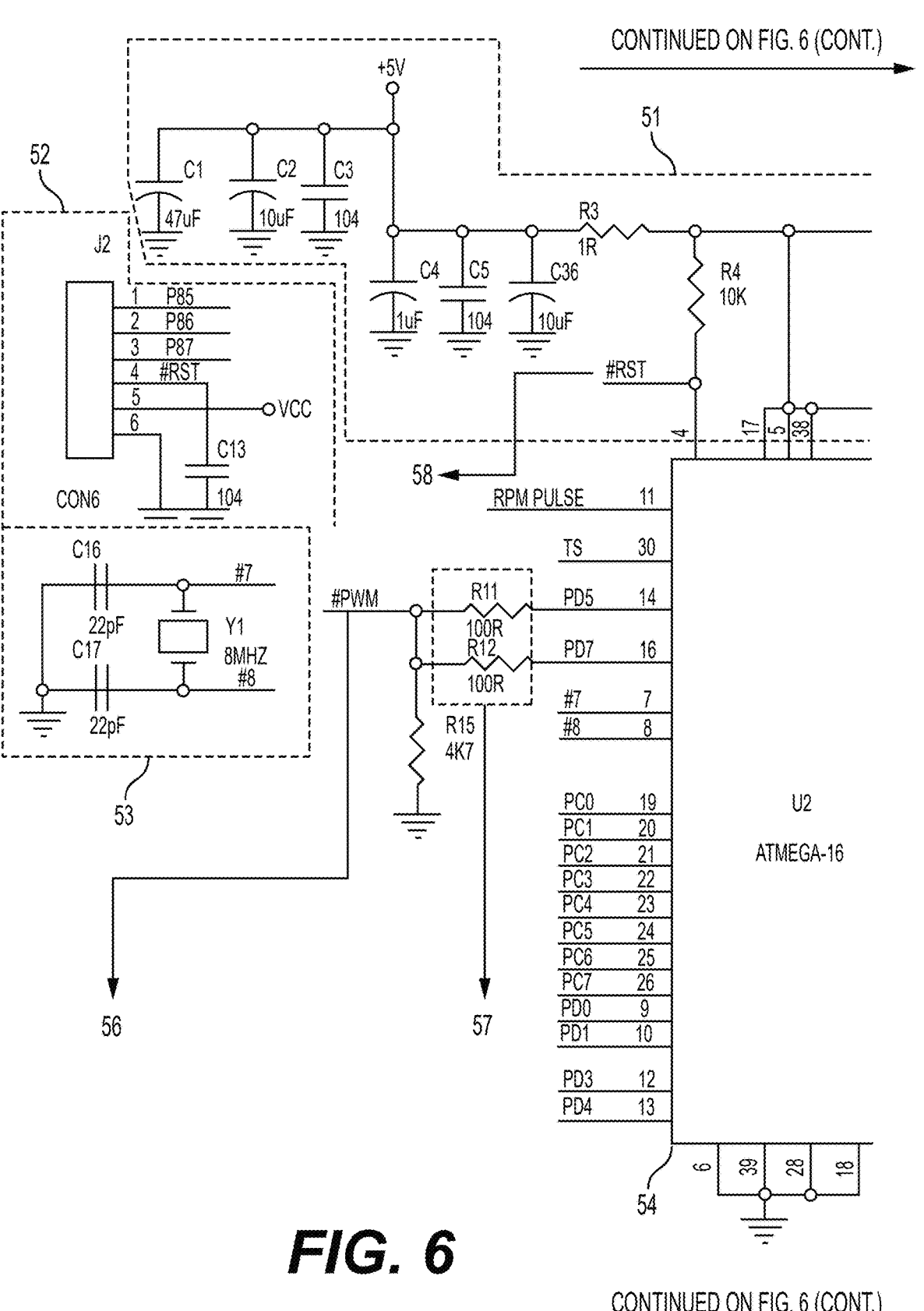
FIG. 6 is a schematic diagram of a microcontroller circuit of the pEDMM.
Figure 6:
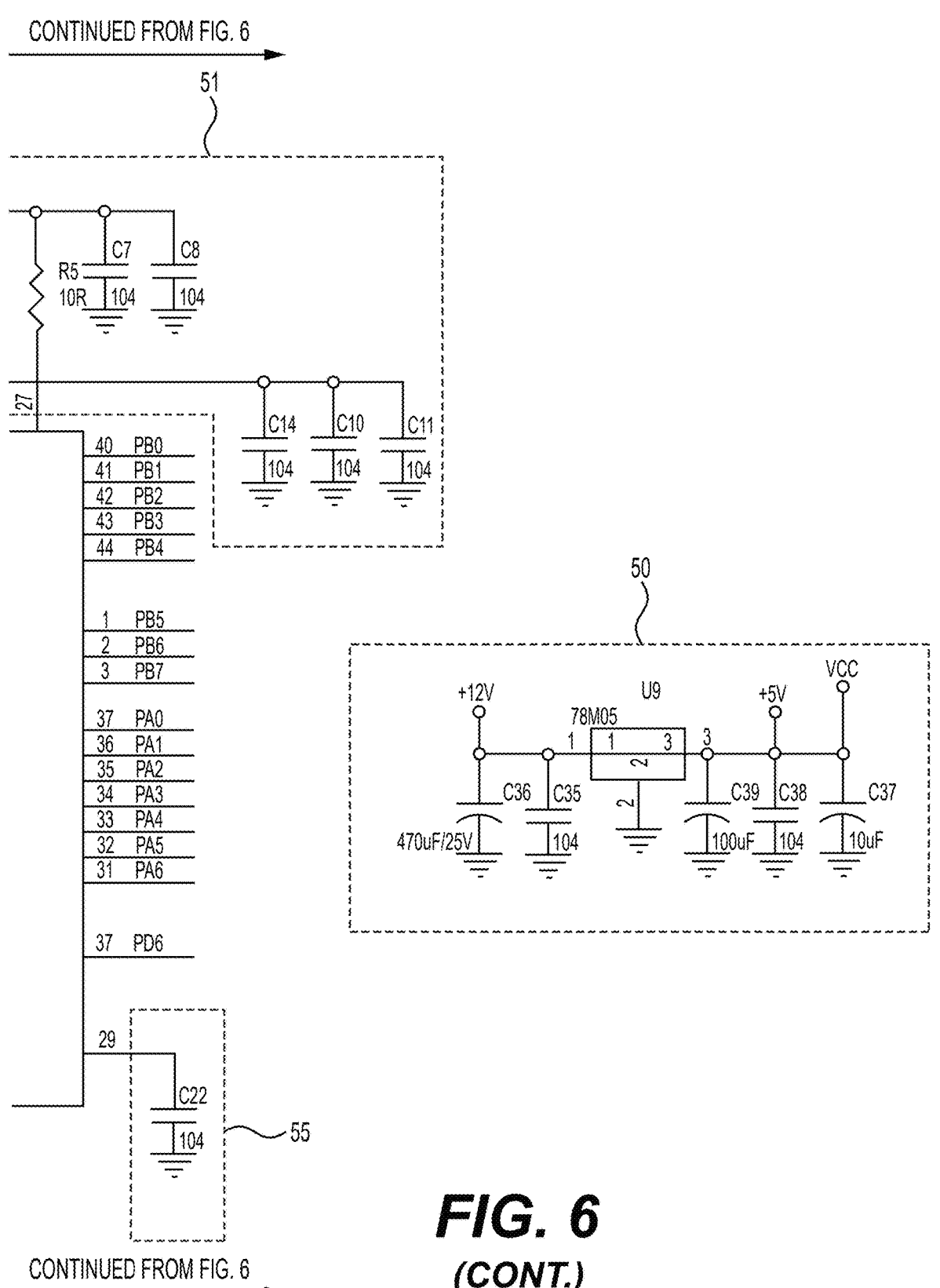
Figure 7:
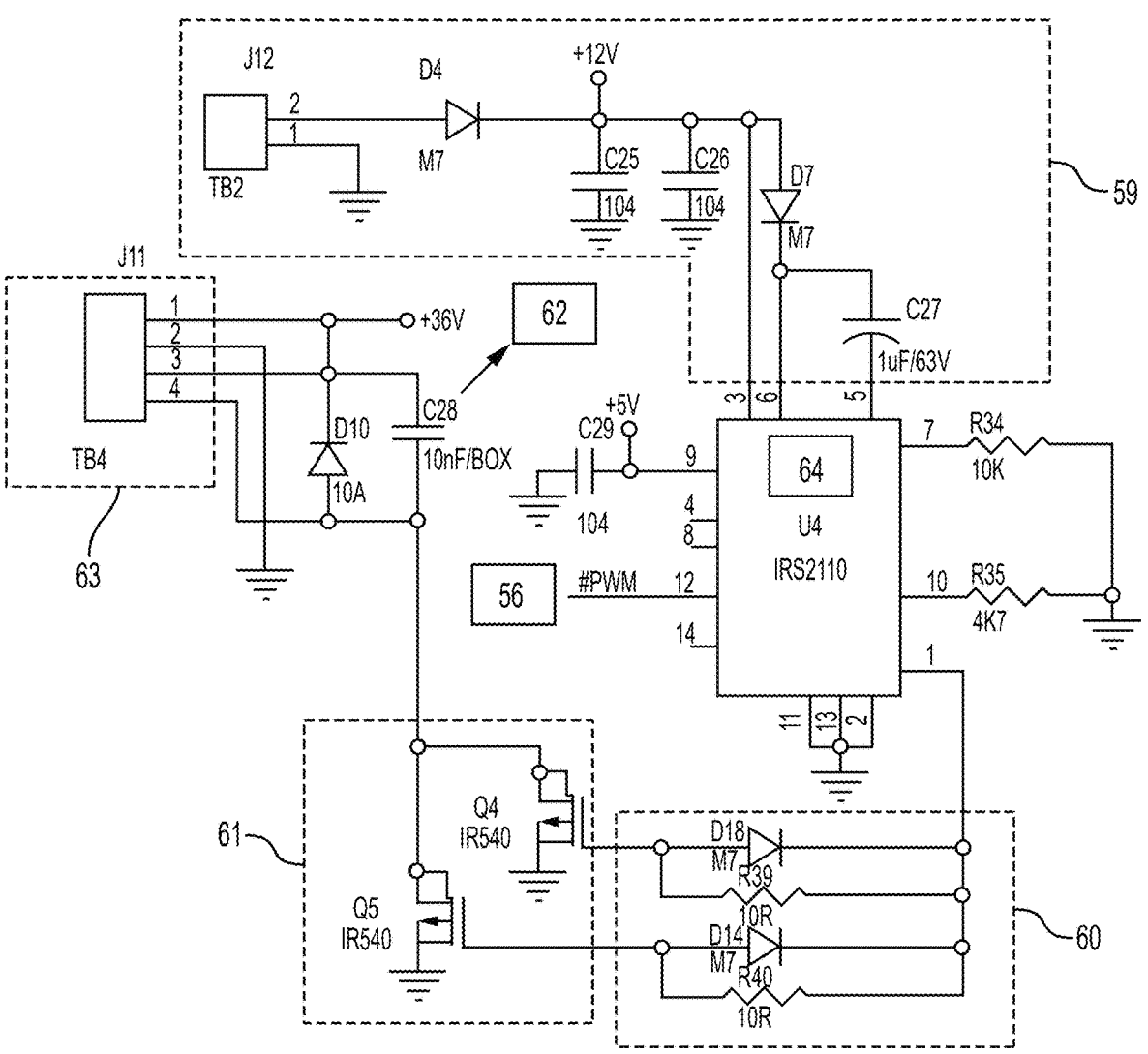
FIG. 7 is a schematic diagram of a MOSFET driver circuit of the pEDMM.
Figure 8:
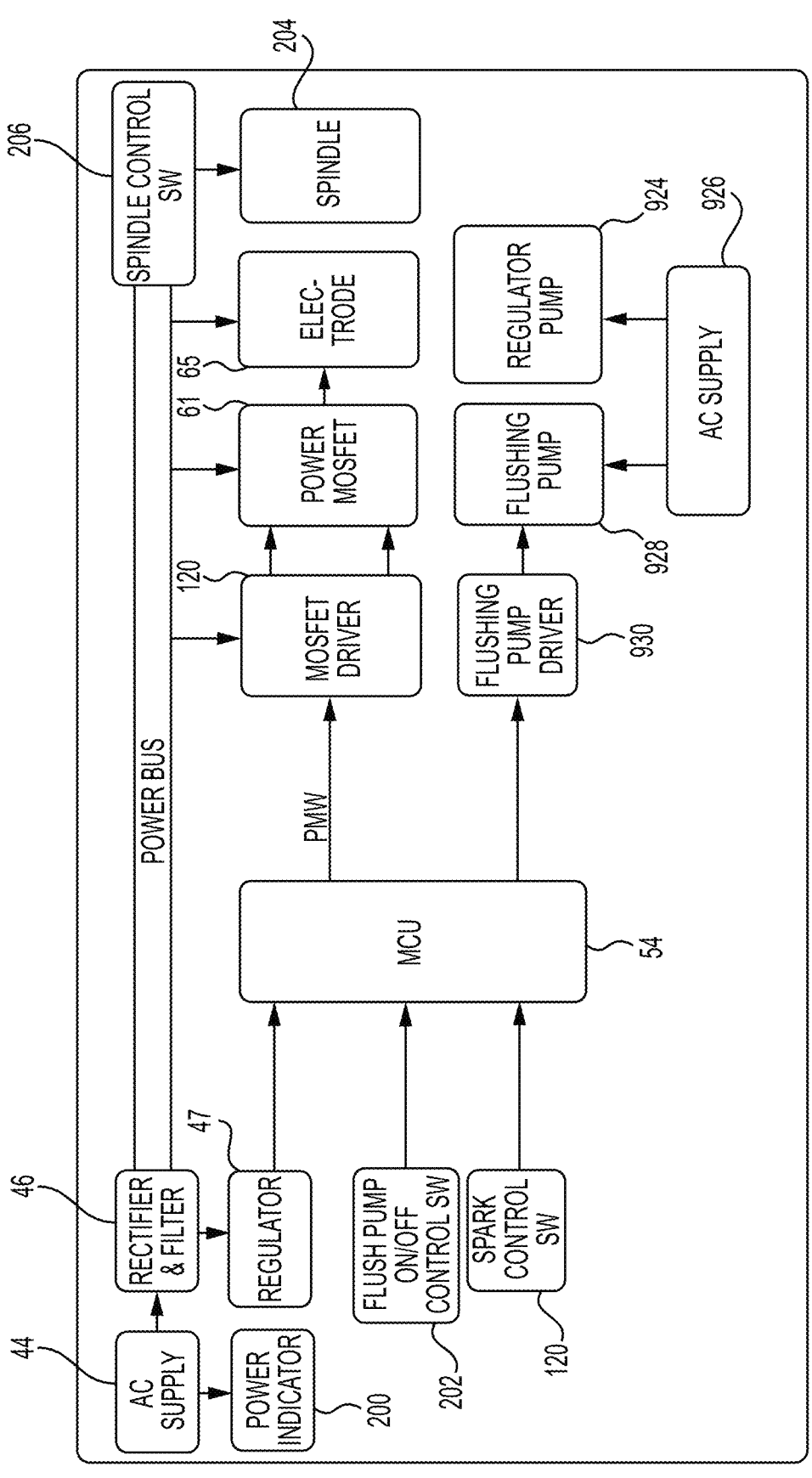
FIG. 8 is a control circuit block diagram for the pEDMM.

The present disclosure describes embodiments of micro-electric discharge milling machines (pEDMMs). Specific details of various pEDMMs are set forth in the following description to provide a thorough understanding of these embodiments. The machine as described includes mechanical components and electrical components. Mechanical components are shown in FIG. 1, FIG. 2, FIG. 3, FIG. 4, FIG. 9 and FIGS. 10A and 10B. Electrical components are shown in FIG. 5, FIG. 6, and FIG. 7. For easy understanding, a machine functional circuit block diagram is shown in FIG. 8.

Figure 1:
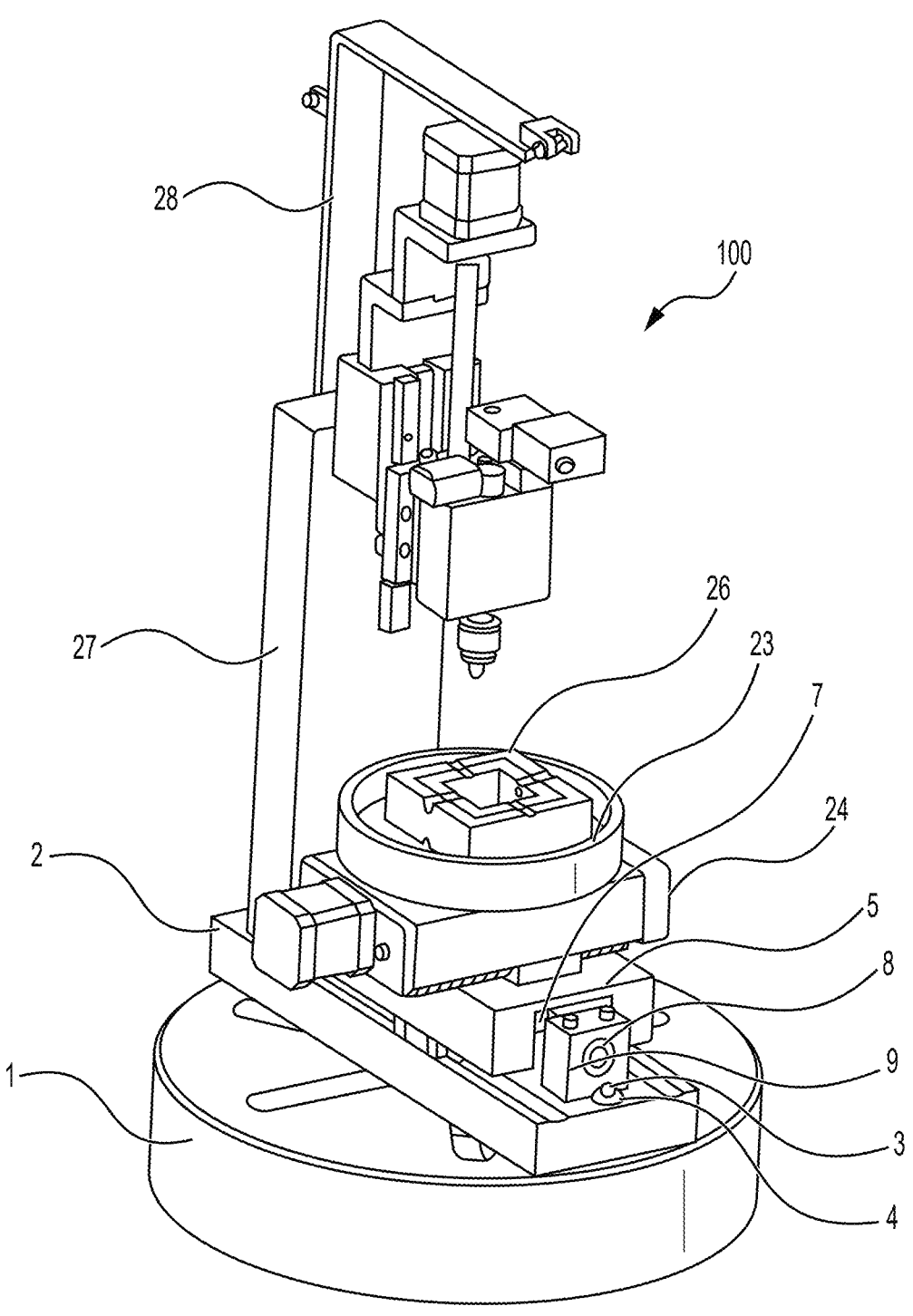
FIG. 1 is a perspective view of a micro-electric discharge milling machine (pEDMM).

FIG. 1 is an illustration of a pEDMM 100. The parts of the pEDMM 100 may be made of cast iron, die steel, aluminum and/or copper, as non-limiting examples. The pEDMM 100 rests on a round machine base 1 on which the machine bed 2 is mounted using bolt 3 and clamp 4, although it should be understood that any suitable type of attachment may be utilized. Y-axis guide plate 5 is attached to machine bed 2 using guideways 6 (see FIG. 2) for smooth movement in the Y-direction.

The linear motion of the Y-axis guide plate 5 is provided by ball screw 7 which is supported by bearing 8 and screw support 9. Linear bearings 10 (see FIG. 2) are used between Y-axis guide plate 5 and guideways 6 (see FIG. 2) to provide smooth motion to the workpiece in the Y-direction.

Figure 2:
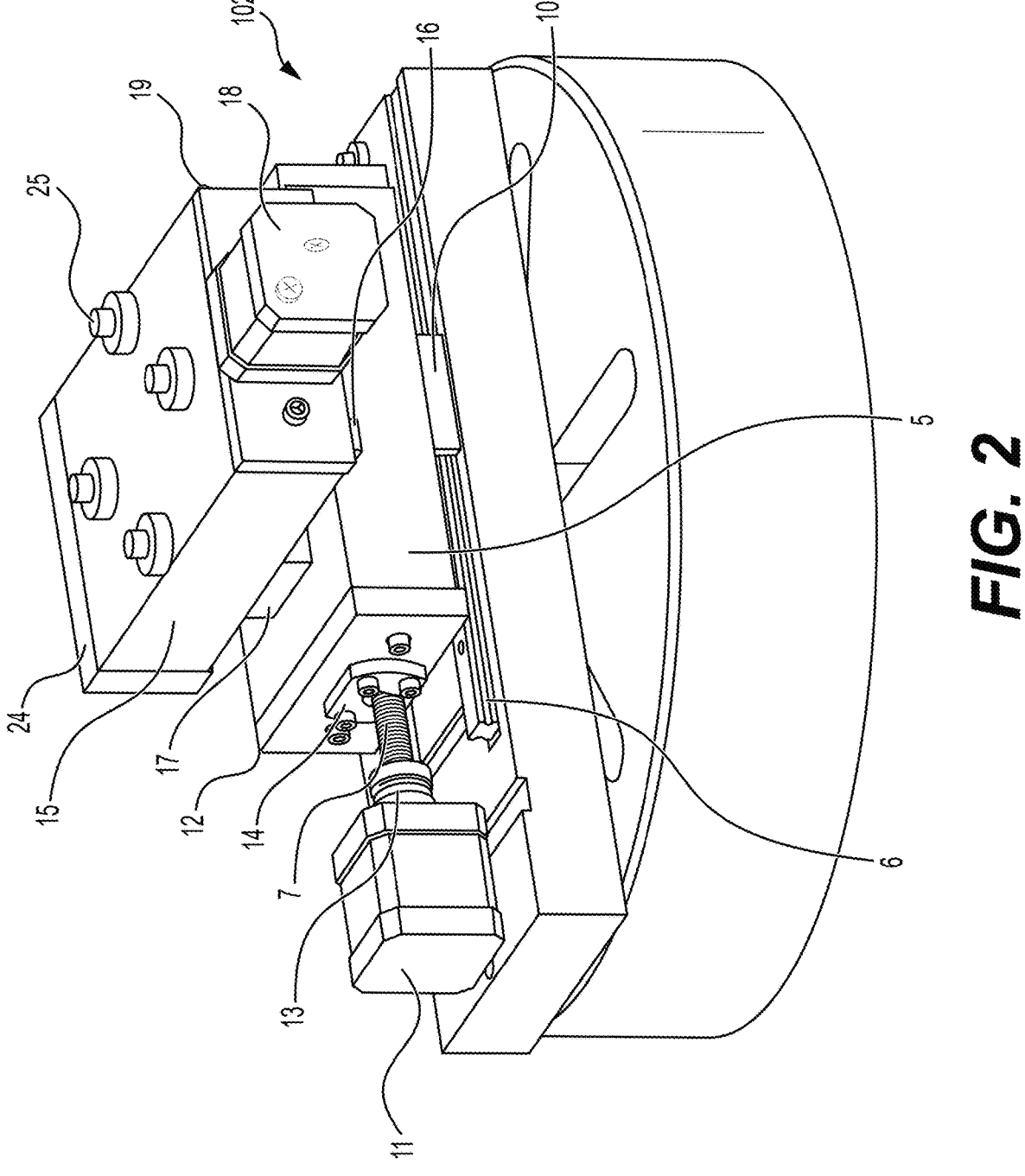
FIG. 2 is a perspective view of a Y-axis assembly of the pEDMM.

FIG. 2 is an illustration of a Y-axis assembly 102 of the pEDMM 100. Rotating motion of stepper motor 11 is transferred to the linear motion of the Y-axis guide plate 5 using Y-axis motor plate 12 and nut 14. Ball screw 7 is attached to the stepper motor 11 using coupling 13 to facilitate the movement of Y-axis guide plate 5 in the Y-direction. An X-axis guide plate 15 is mounted on the Y-axis assembly 102 using guideways 16 and linear bearing 17 (see also FIG. 3). The stepper motor 18 is attached to the X-axis guide plate 15 using X-axis motor plate 19 and Allen bolts or the like.

Figure 3:
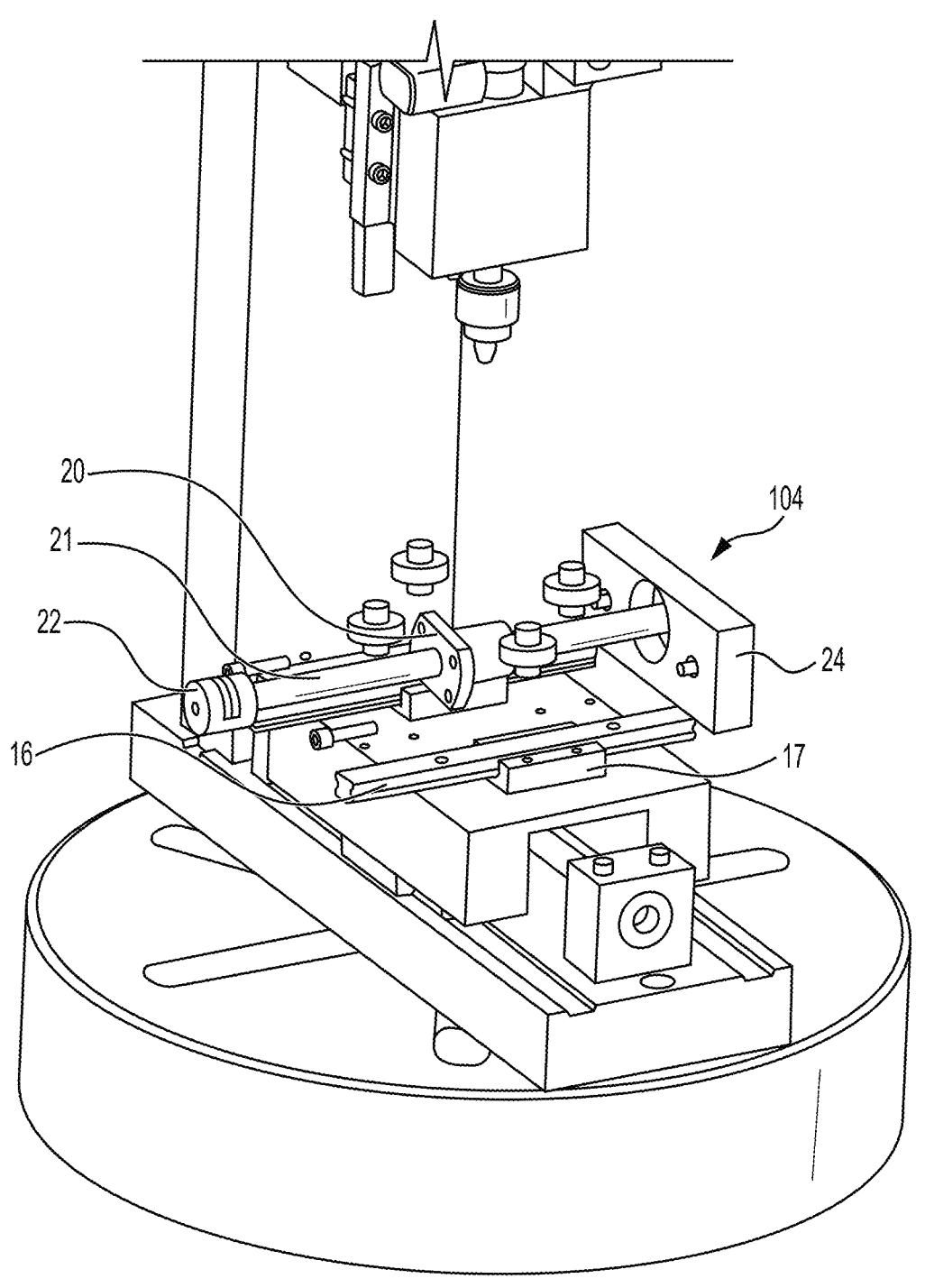
FIG. 3 is a partial perspective of the pEDMM, showing an X-axis assembly thereof.

FIG. 3 is an illustration of an X-axis assembly 104 of the pEDMM 100. As illustrated in FIG. 2, rotating motion of stepper motor 18 is transferred to the linear motion of the X-axis guide plate 15 using X-axis motor plate 19 and nut 20 (see FIG. 3). Ball screw 21 is attached to the stepper motor 18 using coupling 22 to facilitate the movement of X-axis guide plate 15 in the X-direction. X-axis side handle plate 24 (see also FIGS. 1 and 2) is attached to X-axis guide plate 15 to cover the X-axis assembly.

As illustrated in FIGS. 1 and 2, round workpiece platform 23 is mounted on the X-axis assembly 104 using insulation bush 25. Copper base 26 is fastened on the round workpiece platform 23 to hold the workpiece. Vertical plate 27 is connected to machine bed 2 to hold the machine head. Counterweight clamp 28 is attached to vertical plate 27 to hold a counterweight, thereby providing stability and preventing tipping of the pEDMM 100.

Figure 4:
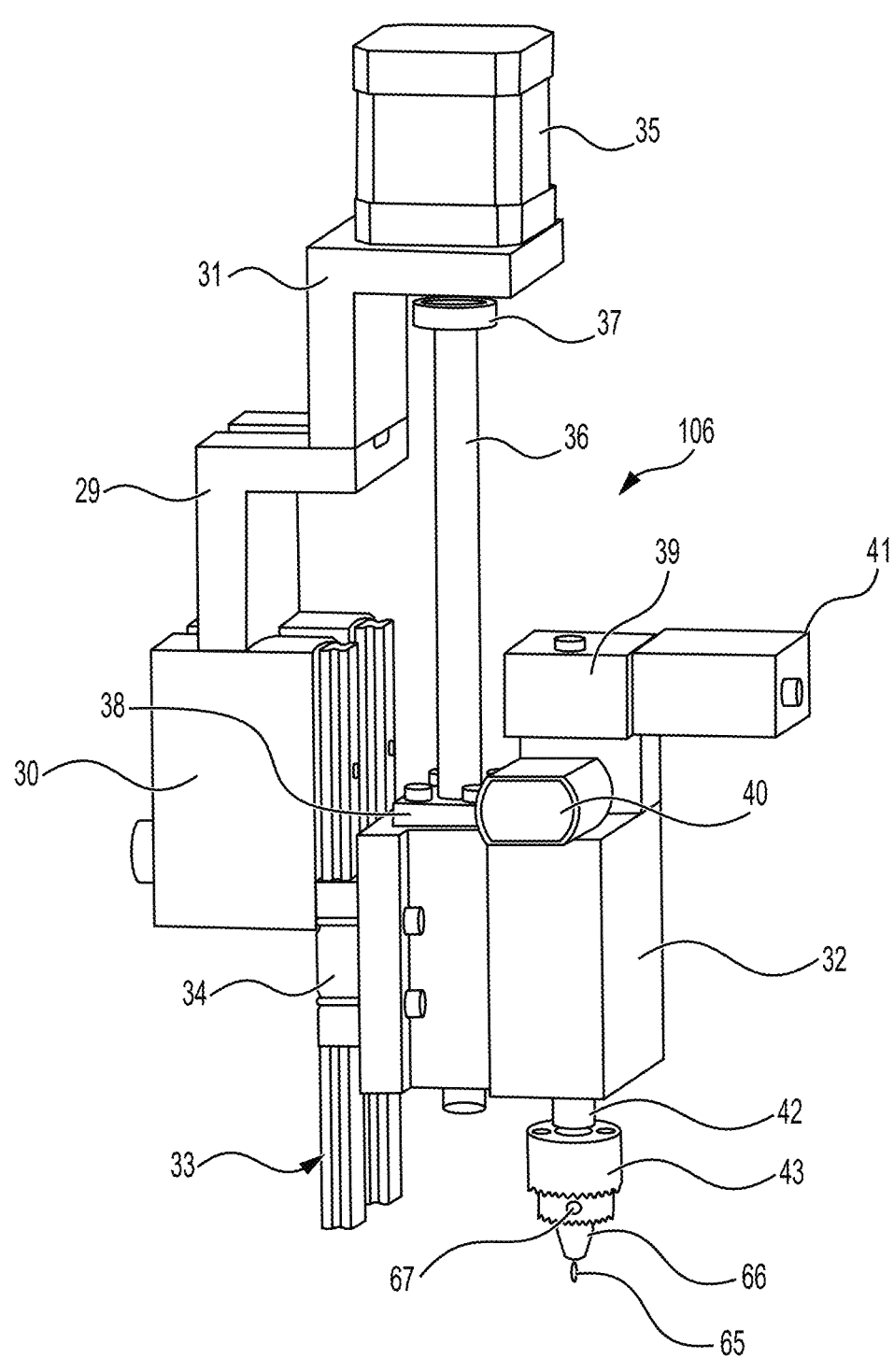
FIG. 4 is a perspective view of a vertical drive of the pEDMM.

FIG. 4 is an illustration of a vertical drive 106 of the pEDMM 100. Z-axis interface 29 is attached to Z-axis drive support 30 at one end, which is fixed with vertical plate 27 (see FIG. 1) and Z-axis motor support 31 at the other end. The Z-axis guide plate 32 is mounted with Z-axis drive support 30 with the help of guideways 33 and linear bearings 34. The stepper motor 35 is fixed on Z-axis motor support 31 and coupled with ball screw 36 using coupling 37. Ball screw 36 is attached to the Z-axis guide plate 32 using nut 38 to facilitate the movement of the tool in the Z-direction.

Motor guide 39 is fastened over the Z-axis guide plate 32 to support the spindle motor 40. Water inlet block 41 is also mounted on the Z-axis guide plate 32 to direct the water supply pipe at the machining spot. Drill chuck shaft 42 is attached inside the Z-axis guide plate 32 and includes a spindle motor 40 and drill chuck 43 fixed on either end. Drill chuck 43 is used to hold the cylindrical tool to perform the machining operations. A rotating electrode 65 can be used as the cylindrical tool and attached to the drill chuck 43 by clamping three precision jaws 66 of the drill chuck 43 onto the rotating electrode 65 through a drill chuck key (not shown) using the drill chuck keyhole 67. A shank 68 at one end of the rotating electrode 65 is clamped by the three precision jaws 66 and the other end is ground to a 100 μm diameter or less which is responsible for machining.

FIG. 5 is a circuit diagram for spark control. The AC supply 44 passes through a step-down transformer 45 and a bridge rectifier 46. Output from the bridge rectifier 46 is provided to the hybrid RC circuit 47, which serves as a regulator. An ammeter 48 and a voltmeter 49 are connected to the output of bridge rectifier 46. As shown in FIG. 5, a positive terminal is connected to the work-piece and a negative terminal is connected to the MOSFET driver circuit described in FIG. 7. Power may be indicated by any suitable type of power indicator 200.

FIG. 6 is an illustration of a microcontroller circuit. Switched mode power supply 50 supplies power to the micro-controller U2 ATMEGA-18 54. A decoupling capacitor circuit 51, a programming connector 52 and a crystal oscillator 53 are connected to the micro-controller through different pins. A separate decoupling capacitor 55 is connected at pin 29 of the micro-controller. The MCU output pulse width modulated signal 56 passes through a set of resistors 57 to the U4IR2110 IC 64 illustrated in FIG. 7.

FIG. 7 is an illustration of a MOSFET driver circuit. The PWM input 56 to the IC 64 is given via pin 12. The IC 64 is given 12 V DC from power supply 59 through a J12 connector. The IC 64 is connected to the Power MOSFETs 61 through gates 60 as shown in FIG. 7. A decoupling capacitor 62 is connected to the Power MOSFETs 61 output signal. Input from the cathode and output from the MOSFET driver circuit is delivered via J11 connector 63.

The pEDMM 100 as described provides a mechanism and setup to perform milling operations at a micro-level using electric discharge and also provides the provision to control the machining operation using computer numeric control. The main body of the pEDMM 100 includes the machine bed 2, X-axis, Y-axis and Z-axis assemblies, and a counterweight assembly fixed to the machine base 1. The tool is held in the drill chuck which is attached with the drill chuck shaft and mounted on the Z-axis guide plate. The workpiece on which machining is performed is fastened on the copper base, which is mounted on the round workpiece platform. The vertical feed to the tool is given by a stepper motor and ball screw assembly and the whole vertical drive is attached to the vertical plate. The movement of the workpiece in the X- and Y-directions is given by the stepper motor, ball screw, nut, guideways and linear bearing which are attached on the machine bed. The machining operation is performed by the vertical feed of the tool and the movement of workpiece platform in the X- and Y-directions. The stepper motors are operated by the pulse signals sent by the control unit as per the part program.

FIG. 8 is a control circuit block diagram for the pEDMM 100. Machining is performed by generating a spark due to electric discharge between the tool and workpiece using Spark Control Software (Spark Control SW) 120. The spark current, voltage, ON time and OFF time is controlled by the controller (MCU) 54 depending upon the type of base material and geometry of the machined product.

For spark control, a 220 V AC main supply is converted to 60 V AC using the step-down transformer 45. This 60 V AC is converted to DC using a bridge rectifier circuit 46. A hybrid RC circuit 47 is used for noise reduction of the DC supply from the bridge rectifier 46. The positive terminal or anode is connected to the work-piece through an ammeter 48 which monitors the current during spark. The negative terminal or cathode is connected to the electrode/tool via a MOSFET which acts as a switching device using the pulse signals from the pulse control circuit. A voltmeter 49 is connected between the anode and cathode to monitor the voltage. Maximum current and zero voltage are observed at the time of spark in the ammeter and voltmeter 48, 49, respectively.

In the micro-controller circuit, the power supply to the micro-controller unit (MCU) 54 is provided using a Switched-Mode Power Supply (SMPS) circuit 50 which converts power using switching devices and storage components, for example, capacitors and inductors, to supply power when the switching device is not in a conduction state. A decoupling capacitor circuit 55 is used to filter out the noise from the input power. The program design for pulse width modulation (PWM) is provided to the micro-controller 54 by a programming connector. A crystal oscillator 53 is used to increase the working frequency of the micro-controller 54.

The potential of a 5V PWM output signal from the MCU 54 is decreased using resistors before it is provided as input to a MOSFET Driver Integrated Circuit (IC) 122. The reset pin (RST) 58 can be used to reset the micro-controller 54.

For pulse control via the MOSFET driver circuit, an IR2110 IC 64 is used to control the MOSFETs 61 due to the difference in the operating voltage for electric discharging and controlling the circuit. A 12 V DC power supply 59 is provided to the IC 64 via the J12 connector. The driver IC 64 receives the PWM input signal from the micro-controller 54 whose output is sent to drive the MOSFET gates 60. The cathode of the hybrid RC circuit 47 supplies 60 V DC power to pins 1 and 2 of the J11 connector and the potential of the ground wire is controlled and is connected with the ground wire of the MOSFETs 61. The output is obtained via pins 3 and 4 of the J11 connector. MOSFETs 61 use the signal from the IC 64 for switching on and off the output 60 V DC supply provided to the electrode/tool via pins 3 and 4 of the J11 connector.

Figure 9:
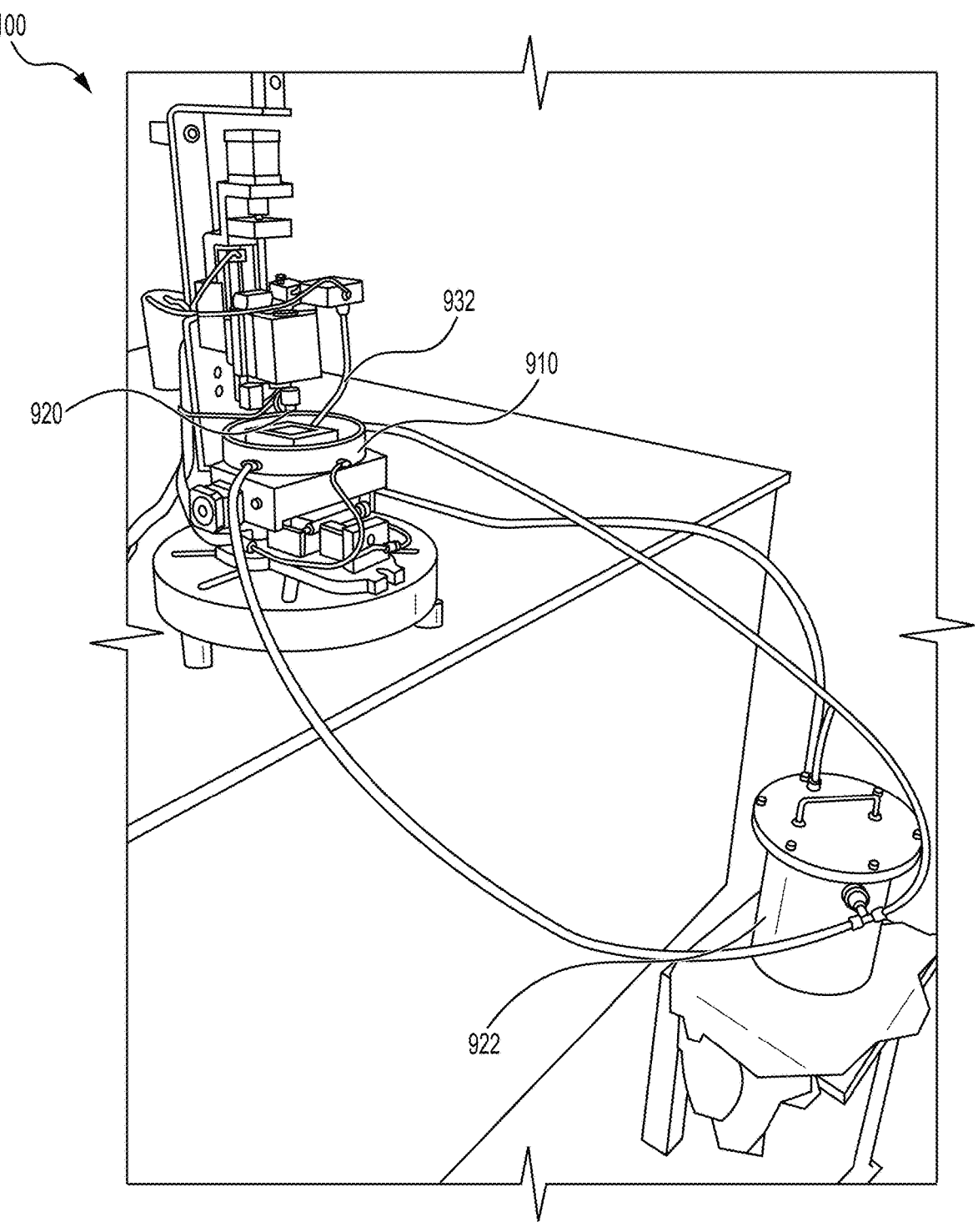
FIG. 9 is a perspective view of the pEDMM with a dielectric bin/tub and a rotating electrode.

FIG. 9 is an illustration of the pEDMM 100 with a dielectric bin/tub 910 and a rotating electrode 920. The rotating electrode 920 can have a small diameter and could be as small as 100 μm in diameter. The rotating electrode 920 is mounted on a spindle 204 supporting the drill chuck 43. The spindle 204 can be moved in the Z-direction. The spindle is under control (through the spindle motor) of spindle control software 206, which may operate in the MCU 54. A workpiece is held in the dielectric bin/tub 910 and a high intensity spark is applied through the rotating electrode 920 onto the surface of the workpiece, evaporating and melting a tiny portion of the surface, resulting in shaping the workpiece. The non-conducting dielectric fluid breaks down due to the gap-voltage and supplies discharge energy utilized for machining. The non-conducting dielectric fluid may be provided by a tank 922 with a filter and a submersible pump 924, for example. The pump 924 may be powered by a conventional AC power supply 926, for example, and a flushing pump 928 may be used to flush the system (under the control of a flushing pump driver 930 or the like). Flushing control may be provided by control software (SW) 202 operating on MCU 54 for turning the flushing pump 928 on and off. The dielectric fluid may be applied through a supply hose 932 with a nozzle or the like. The dielectric fluid, as a non-limiting example, may be deionized water and is delivered to the workpiece.

Figure 10A:
FIG. 10A and FIG. 10B are partial perspective views of the pEDMM, showing the rotating electrode thereof secured to a drill chuck.
Figure 10B:
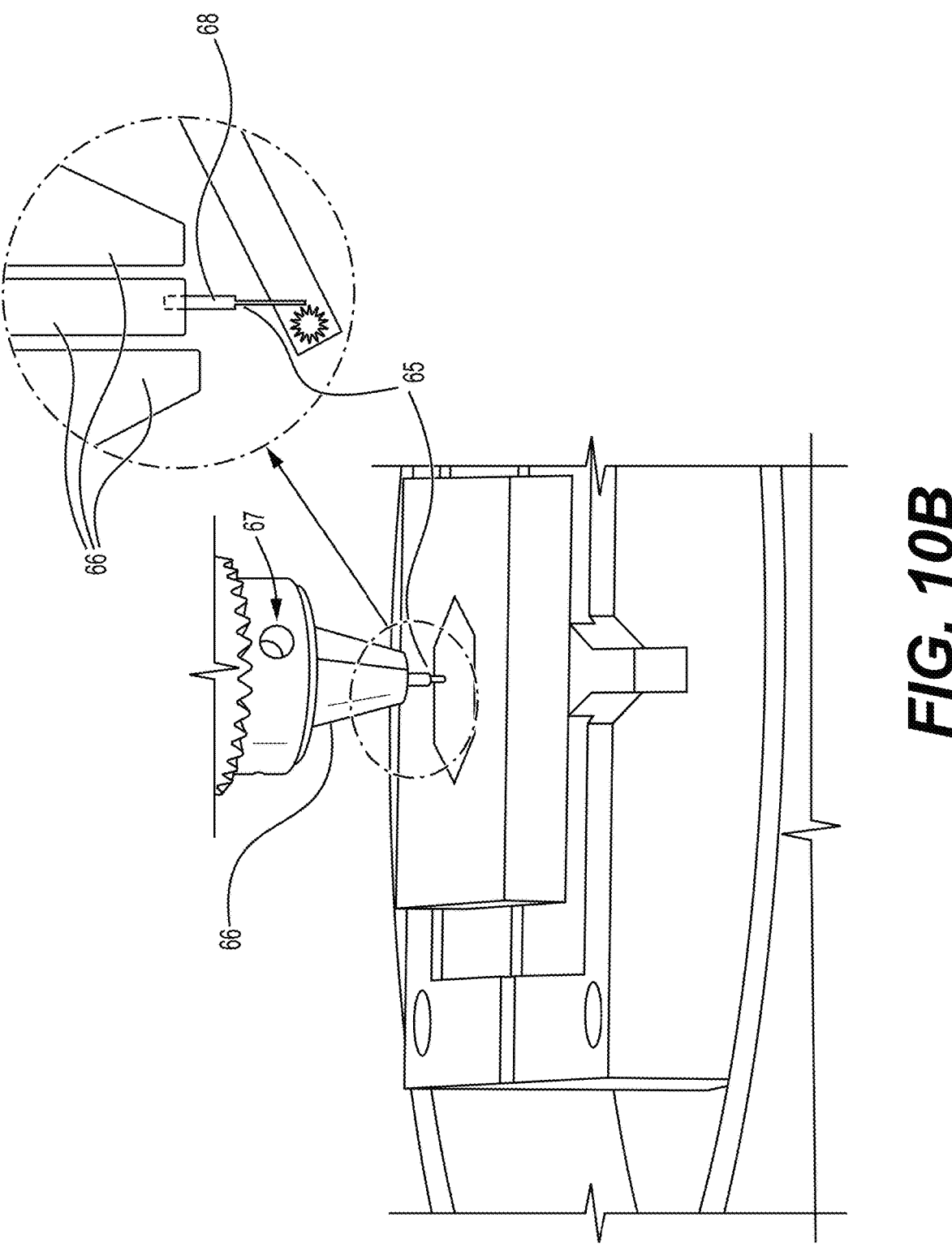

FIGS. 10A and 10B show the pEDMM 100 with the rotating electrode 65 secured to a drill chuck 43 with, as a non-limiting example, three precision jaws 66 through a drill chuck key (not shown) using the drill chuck keyhole 67. A shank 68 at one end of the rotating electrode 65 is clamped by the jaws 66 and the other end is ground to a 100 μm diameter for machining. The micro-sized rotating electrode 65 that operates through a spark between itself and the workpiece is subject to rapid erosion. The control of spark energy and the rotation of the micro-sized electrode 65 is unique to provide sufficient tool life to machine a component. The rotating surface of the micro-sized electrode 65 continuously shifts the location of the spark on the surface of electrode and saves it from erosion.

The rotating electrode 65, which may be made from tungsten, copper or the like, and the workpiece are submerged in the dielectric fluid (e.g., deionized water) within the dielectric bin/tub 910 to facilitate the machining process and to flush away debris.

A high-frequency electrical discharge is initiated between the rotating electrode 65 and the workpiece. This discharge creates a series of plasma channels in the dielectric fluid. As the discharge occurs, material from the workpiece is eroded away in the form of tiny sparks or micro-craters. The movement of the rotating electrode 65 and the workpiece are precisely controlled using computer numerical control (CNC) or other automated systems. This allows for the creation of intricate and precise shapes with high repeatability.

The repeated electrical discharges gradually erode away material from the workpiece, shaping it according to the desired design. After the desired shape is achieved, additional finishing processes may be employed to improve surface roughness and dimensional accuracy.

It is to be understood that the pEDMM is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A micro-electric discharge machine, comprising:
   a base having an X-axis guide plate mounted thereon, the X-axis guide plate allowing for movement in the X-direction;
   a Y-axis guide plate mounted on the X-axis guide plate, the Y-axis guide plate allowing for movement in the Y-direction;
   a dielectric bin located on the Y-axis guide plate, the dielectric bin being movable in the X-direction and the Y-direction via the X-axis guide plate and Y-axis guide plate, respectively;
   a workpiece platform located within the dielectric bin, the workpiece platform being adapted for securing a workpiece;
   a vertical plate extending from the base, the vertical plate having a Z-axis guide plate;
   a drill chuck mounted on the Z-axis guide plate for securing a rotating electrode;
   a spark control circuit monitoring current to the workpiece and generating a spark between the rotating electrode and a surface of the workpiece thereby continuously shifting the location of the rotating electrode and delivering the spark onto a surface of the workpiece to evaporate and melt a portion of the surface of the workpiece; and
   a dielectric fluid inlet block mounted on the Z-axis guide plate for directing a dielectric fluid to a machining spot.

2. The micro-electric discharge machine as recited in claim 1, wherein the rotating electrode is movable in the Z-direction via the Z-axis guide plate.

3. The micro-electric discharge machine as recited in claim 1, wherein the dielectric bin is adapted for receiving the dielectric fluid such that the rotating electrode and the workpiece may be submerged therein.

4. The micro discharge machine as recited in claim 1, further comprising a counterweight clamp mounted on the X-axis guide plate.

5. The micro discharge machine as recited in claim 1, further comprising a spindle motor connected to a spindle mounted within the drill chuck for rotating the rotating electrode.

* * * * *